Figure 1:
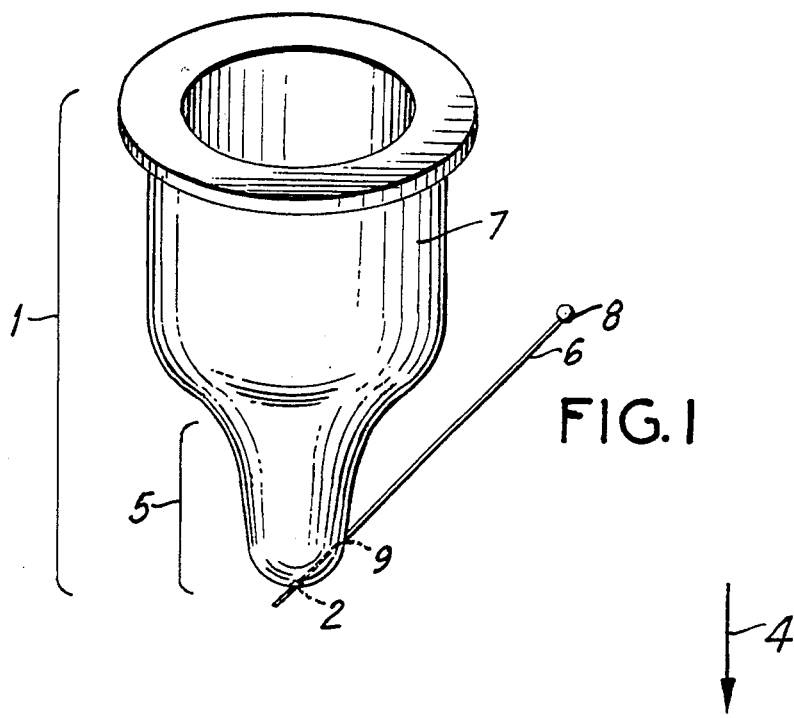

United States Patent [19]
Bohler

[11] Patent Number: 5,348,188
[45] Date of Patent: Sep. 20, 1994

[54] MICRO-DOSING DEVICE FOR POWDERY AND GRANULATE SUBSTANCES

[76] Inventor: Lorenz Bohler, Rüttenweg 61, 4313 Mölin Schweiz, Switzerland

[21] Appl. No.: 946,308
[22] PCT Filed: Feb. 19, 1992
[86] PCT No.: PCT/CH92/00032
 § 371 Date: Nov. 4, 1992
 § 102(e) Date: Nov. 4, 1992
[87] PCT Pub. No.: WO92/15275
 PCT Pub. Date: Sep. 17, 1992

[30] Foreign Application Priority Data

Mar. 5, 1991 [CH] Switzerland .............. 749/91-6

[51] Int. Cl.$^5$ ............................................. B65D 83/06
[52] U.S. Cl. ............................ 222/1; 222/203; 222/490
[58] Field of Search .............. 222/1, 196, 200, 203, 222/213, 490, 494, 501, 505, 507, 510; 215/11.1

[56] References Cited

U.S. PATENT DOCUMENTS

| | | | |
|---|---|---|---|
| 659,233 | 10/1900 | Hoyer | 222/203 X |
| 1,942,581 | 1/1934 | Tolman | 222/200 |
| 2,254,448 | 9/1941 | Pursel | 222/200 |
| 2,546,681 | 3/1951 | Searer | 222/490 X |
| 2,753,067 | 7/1956 | Rodriguez | 215/11.1 |
| 2,760,665 | 8/1956 | Zenker | 215/11.1 |
| 2,802,608 | 8/1957 | Gassaway | 222/490 |
| 3,002,660 | 10/1961 | Taylor | 222/490 |
| 3,139,064 | 6/1964 | Harle | 215/11.1 X |
| 3,342,318 | 9/1967 | Ruckberg | 222/490 |
| 4,280,675 | 6/1981 | Wicks et al. | 222/196 |
| 4,603,784 | 8/1986 | Chang | 215/11.1 |

FOREIGN PATENT DOCUMENTS

| | | | |
|---|---|---|---|
| 1191370 | 11/1985 | U.S.S.R. | 222/196 |
| 1377217 | 2/1988 | U.S.S.R. | 222/200 |
| 1384479 | 3/1988 | U.S.S.R. | 222/200 |
| 0283251 | 3/1988 | United Kingdom . | |

Primary Examiner—Andres Kashnikow
Assistant Examiner—Kenneth Bomberg
Attorney, Agent, or Firm—Anderson Kill Olick & Oshinsky

[57] ABSTRACT

The proposed micro-dosing device is suitable for finely dosing powdery and granulate substances in quantities lying in the gram, milligram or microgram range. The dosing element per se consists of a nipple (1) comparable to those found on baby bottles. The material outlet (2) is formed by a slit-shaped opening located at the end of the tip (5) of the dosing nipple (1). Varying the lateral pressure applied to the tip (5) causes the material outlet (2) to be opened to various degrees. An activator needle (6) is provided for activating the substance filled in the dosing nipple (1); the needle is stuck into the wall of the dosing nipple (1) at a small distance above the material outlet (2); the tip of the needle projects through the opening of the material outlet (2) below. If large quantities are to be micro-dosed, the dosing nipple (1) can be mounted to a stock bottle (11) via a detachable connector.

10 Claims, 2 Drawing Sheets

U.S. Patent  Sep. 20, 1994  Sheet 1 of 2  5,348,188

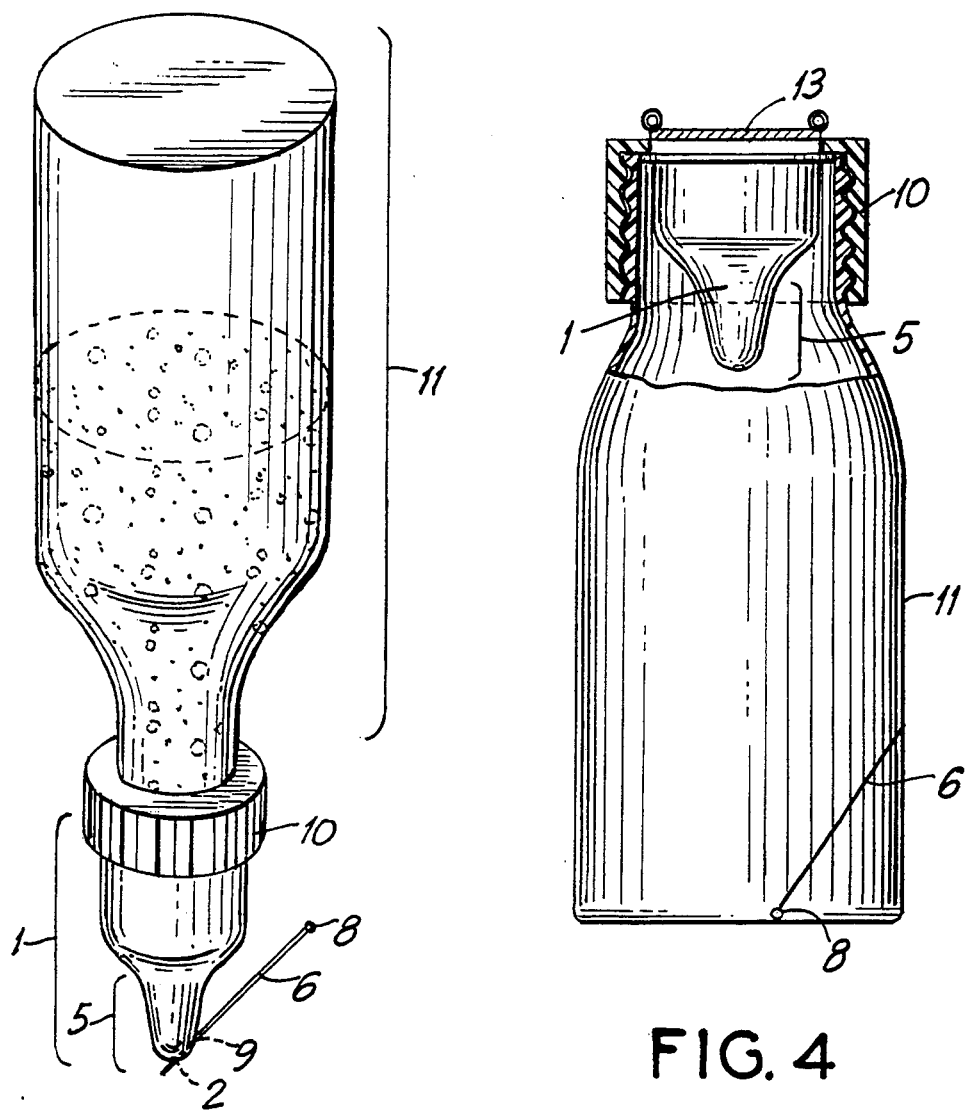
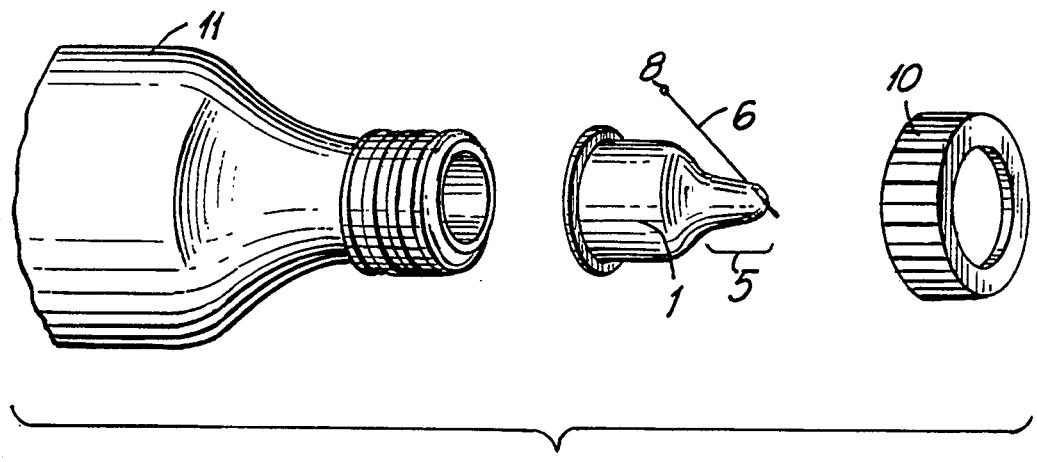
FIG. 3a
FIG. 4
FIG. 3b

MICRO-DOSING DEVICE FOR POWDERY AND GRANULATE SUBSTANCES

In the chemical and biochemical industries and in chemical and biochemical laboratories one is repeatedly faced with the task of having to dose minute quantities of powdery or granulate substances. Dosing in the gram, milligram or microgram range is necessary, for example, in order to fill substances for sale in suitable package receptacles or for use in suitable laboratory vessels. The substances in question may be substances used in chemical or biochemical manufacture, in chemical or biochemical research, or as active ingredients in medicine.

The problem does not lie in measuring the weight, as there are extremely high-precision scales available for the aforementioned weight range, but rather in filling these minute quantities in the intended receptacles or vessels in a controlled manner.

The following possibilities presently exist for micro-dosing.

One manual dosing possibility is offered by using laboratory, spoons and funnels. A funnel is inserted into the vessel into which a substance is to be filled. A certain quantity of the substance is picked up using a laboratory spoon, whose size depends on the quantity to be filled, and slowly emptied from the spoon into the vessel, which is deposited on a scale, until the fill quantity attains the weight desired. The rate of flow of the substance on the spoon is regulated by changing the angle of the spoon. The substance is activated by tapping one's finger against the spoon. For mechanical micro-dosing there are units which feature vibrating grooves or rotating cylinders which transport the substance.

Manual dosing using a laboratory spoon and funnel is extremely time-consuming and tedious. Overdosing is frequently the result and the dosing sequence has to be begun anew. The design of existing units for mechanical micro-dosing is extremely complex. As a consequence, the units are prone to malfunction. In addition, several unit components come into contact with the substance which have to be accordingly cleaned subsequent to use.

The intention behind the invention was to create a device which can be used to more finely dose powdery and granulate substances in minute quantities within the gram, milligram or microgram range.

This task is solved according to the invention by means of the characteristic features detailed in patent claim 1.

The dosing device according to the invention essentially consists of a nipple (1) as is common on baby bottles. Nipple (1) can be made, of rubber, silicone or other material.

LISTING OF DRAWINGS

FIG. 1 Side view of the dosing nipple with inserted activator needle.

Figure 2A:
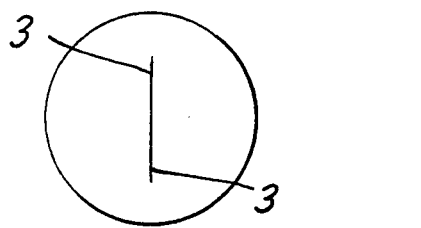

FIG. 2a Tip of the dosing nipple with closed material outlet as viewed from below.

Figure 2B:
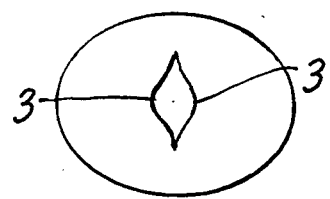

FIG. 2b Tip of the dosing nipple with open material outlet as viewed from below.

FIG. 3a Side view of a dosing nipple mounted to a stock bottle with inserted activator needle.

FIG. 3b Exploded view of the dosing nipple with stock bottle, screw cap and activator needle.

FIG. 4 Cross section of a dosing nipple placed together with an activator needle in a stock bottle for storage purposes.

Figure 5A:
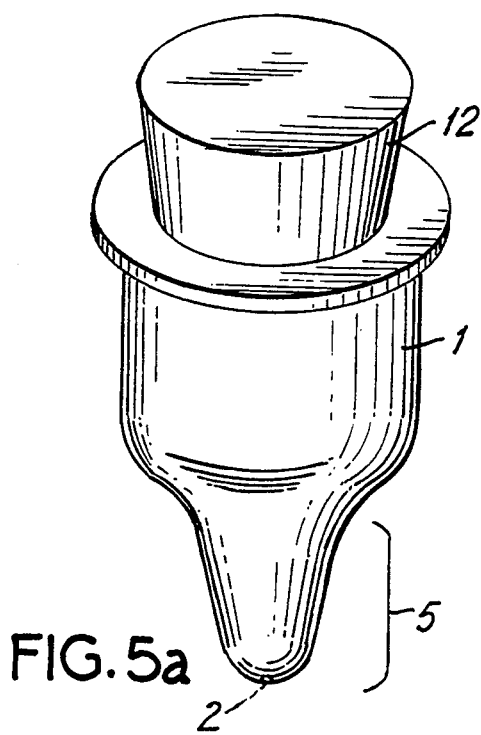

FIG. 5a Side view of a dosing nipple sealed shut with a plug.

Figure 5B:
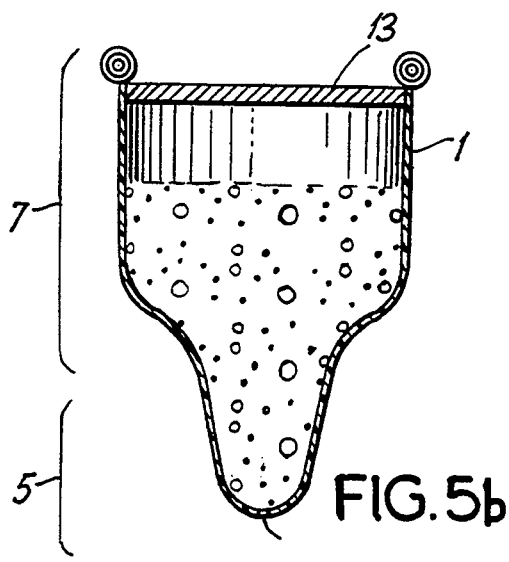

FIG. 5b Cross section of a dosing nipple sealed off by a circular piece of glass.

For dosing the dosing nipple (1) can be hand-held or affixed to a dosing mount. The dosing mount can be in the form of a dosing gun. Dosing is done by shifting the dosing nipple (1) to a vertical position.

The dosing nipple (1) contains a reservoir (7) which is larger in diameter than the nipple and which features a somewhat coniform tip (5) which tapers down to the material outlet (2). The material outlet (2) features a slit-shaped opening located at the end of the tip (5) of the dosing nipple (1). If no lateral pressure is exerted to the tip (5), the material outlet (2) is closed. If lateral pressure is exerted to the tip (5) parallel to the longitudinal sides(3) of the material outlet (2), the tip (5) is squeezed together and, as a consequence, the longitudinal sides (3) of the material outlet (2) are pressed apart. The material outlet (2) opens. The more pressure applied the larger the outlet opening becomes until it attains is maximum size. The lateral pressure can be generated either by manual or mechanical means.

The substance to be dosed is filled into the dosing nipple (1). When the material outlet (2) is opened the substance may not begin to flow immediately from the dosing nipple (1) due to bridging above the material outlet (2). In such cases, the substance must be made to flow using a suitable tool or device, i.e. it must be activated. Needle (6) has been provided as an activator, it being stuck into the wall of the dosing nipple (1) at a small distance (1–2 cm) above the material outlet at a sharp angle to the longitudinal axis of the dosing nipple (1). The activator needle (6) is pushed in the direction of the material outlet (2) until its tip extends from the outlet opening. In order to activate the substance to be dosed, the activator needle (6) is either pressed down or to the back at the needle head (8). The wall of the dosing nipple (1) is consequently deformed in the vicinity of the needle insertion point (9). By flicking the activator needle (6) both the needle as well as a large wall section surrounding the needle insertion point (9) are caused to vibrate. As a consequence, the substance in the dosing nipple (1) is activated by the vibration. This activation procedure can be repeated as soon as the wall of the dosing nipple (1) and the activator needle (6) return to their initial position. The activator needle (6) can be actuated either manually or mechanically. If large quantities are to be micro-dosed, the dosing nipple (1) can be mounted to a stock bottle (11) by way of a screw cap (10) or other detachable connector. If the quantity to be dosed is so small, however, that the space inside the dosing nipple (1) suffices, then dosing can be done without the benefit of the stock bottle (11). In such cases the dosing nipple (1) is sealed off at the top by a plug (12) or a circular glass or plastic plate (13).

When a plastic stock bottle (11) capable of being pressed together is used, then coarse dosing can be done by repeatedly pressing together and releasing the stock bottle walls in order to activate the substance to be dosed. The activator needle (6) is then used for fine dosing.

The dosing nipple (1) can stored together with the activator needle (6) in a sealable bottle. One possibility is to seal off the top of the dosing nipple (1) with a circular plate (13) and insert it tip first through the opening of the screw cap (10) screwed onto the stock bottle (11). An electronic control unit is provided for when the dosing nipple (1) is to be operated mechanically. It regulates the mechanism which opens and closes the material outlet (2) and moves the activator needle (6). The vessel intended for receiving the substance is deposited on a scale. The current fill weight is transmitted to the control unit. The target weight can be preset. The control unit compares the current fill weight with the preset target weight and regulates the degree of opening of the material outlet (2) and the movements of the activator needle (6) in accordance with the current fill weight. When the fill weight attains the target weight, the control unit closes the material outlet (2). The control unit can be mounted to the dosing support.

The micro-dosing device according to the invention offers essential advantages as compared with the devices or instruments available to date. The dosing element per se, i.e. the dosing nipple (1), is simple and inexpensive to manufacture. In the event that the dosing element is defective or no longer needed, it can be discarded at no great loss. The devices and units available to date feature complicated dosing elements such as vibrating grooves or rotating cylinders.

The simple design of the proposed dosing device ensures easy application and is virtually unsusceptible to malfunction.

The activator needle (6) also activates material layers located above the needle insertion point (9). In this way a continuous flow of material is achieved, allowing for the precision dosing of the most minute quantities.

Only the dosing element per se, i.e. the dosing nipple (1), comes into contact with the substance to be dosed. Consequently after use only the dosing nipple (1) has to be cleaned. The dosing nipple (1) can be cleaned in various ways. It can be boiled and sterilized, for example. It can also be steamed in hot water vapor. Other possibilities are offered by dipping the dosing nipple (1) in a cleaning solution containing a suitable cleaning agent and causing the cleaning solution to pass through it by squeezing the dosing nipple (1) together several times.

In conclusion it can be said that the micro-dosing device according to the invention stands out by virtue of its simplicity and convenience. Fields of application: chemical or biochemical laboratories, chemical or biochemical production facilities, where it can be used, for example, for filling fine chemicals, or the pharmaceutical industry, where it is suitable, for example, for dosing active ingredients.

I claim:

1. A micro-dosing device for dispensing small doses of powdery and granulate substances, said micro-dosing device comprising:
   a substantially nipple-shaped body consisting of a reservoir and a deformable downwardly tapering tip, formed integrally with said reservoir and having a bottom and a dispensing slit-shaped opening extending substantially horizontally in said bottom, wherein said slit-shaped opening opens upon application of lateral pressure to a periphery of said tip in a direction substantially parallel to longitudinal sides of said slit-shaped opening to dispense a microdose of a substance under the applied pressure and closes upon the applied pressure on said tip being removed; and
   means for inducing flow of the substance upon opening of said slit-shaped opening, said inducing means comprising a needle insertable through said tip at a location above said slit-shaped opening and having an end portion extending through said slit-shaped opening outside of said tip.

2. A device as claimed in claim 1, further comprising means for mounting said device to a substance receptacle.

3. A device as claimed in claim 1, further comprising a covering for sealing an opening located opposite said slit-shaped opening.

4. A device as claimed in claim 3, wherein said covering is formed as a plug.

5. A device as claimed in claim 3, wherein said covering is formed as a disc.

6. A device as claimed in claim 1, further comprising a mount for supporting said device.

7. A device as claimed in claim 1, wherein said slit-shaped opening has a variable size, in an open condition thereof, for dispensing a variable substance dose.

8. A device as claimed in claim 1, wherein said needle extends at an obtuse angle to a longitudinal axis of said device.

9. A method of dispensing micro-doses of powdered and granulated substances, comprising the steps of:
   providing a micro-dosing device comprising a substantially nipple-shaped body consisting of a reservoir and a deformable downwardly tapering tip formed integrally with said reservoir and having a bottom and dispensing slit-shaped opening extending substantially horizontally in said bottom, and means for inducing flow of a substance through said slit-shaped opening upon opening of said slit-shaped opening and comprising a needle insertable through said tip at a location above said slit-shaped opening and having an end portion extending through said slit-shaped opening outside of said tip;
   applying lateral pressure to a periphery of said tip in a direction substantially parallel to longitudinal sides of said slit-shaped opening to open said slit-shaped
   applying at least one of pressure and vibration to said needle to induce flow of the substance through said slit-shaped opening.

10. A method as claimed in claim 9, wherein said applying step includes applying a variable pressure to the tip to open the slit shaped opening to a variable degree to dispense a variable micro-dose of the substance.

* * * * *